United States Patent [19]
Greveling

[11] Patent Number: 4,763,982
[45] Date of Patent: Aug. 16, 1988

[54] OPTICAL CABLE MANUFACTURE

[75] Inventor: Johannes Greveling, Saskatoon, Canada

[73] Assignee: Northern Telecom Limited, Montreal, Canada

[21] Appl. No.: 877,064

[22] Filed: Jun. 23, 1986

[51] Int. Cl.⁴ .............................................. G02B 6/44
[52] U.S. Cl. ................................................ 350/96.23
[58] Field of Search ................................... 350/96.23

[56] References Cited

U.S. PATENT DOCUMENTS

| | | | |
|---|---|---|---|
| 4,113,349 | 9/1978 | Stiles | 350/96.23 |
| 4,172,106 | 10/1979 | Lewis | 350/96.23 |
| 4,269,024 | 5/1981 | Ashpole et al. | 350/96.23 |
| 4,288,144 | 9/1981 | Nakai et al. | 350/96.23 |
| 4,331,379 | 5/1982 | Oestreich et al. | 350/96.23 |
| 4,367,917 | 1/1983 | Gray | 350/96.23 |
| 4,372,792 | 2/1983 | Dey et al. | 350/96.23 |
| 4,414,165 | 11/1983 | Oestreich et al. | 350/96.23 |
| 4,508,423 | 4/1985 | Winter et al. | 350/96.23 |

Primary Examiner—William L. Sikes
Assistant Examiner—Akm E. Ullah
Attorney, Agent, or Firm—R. J. Austin

[57] ABSTRACT

An optical cable having at least one optical fiber in its core, the fiber surrounded by a crush resistant tube. The fiber is loosely contained within the tube which comprises longitudinally extending closely packed tensile filaments embedded in a continuous solidified and rigid carrier. The carrier material is preferably an epoxy resin. A water blocking medium may fill the tube. The tube is made by covering the tensile filaments in the carrier material in a flowable state, guiding the coated filaments through a tubular space so as to fill it and causing solidification of the carrier inside the tubular space. The optical fiber is passed through a tubular guide which defines the inner surface of the tubular space so as to lie within the formed tube.

5 Claims, 2 Drawing Sheets

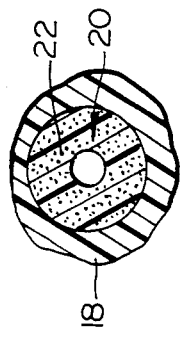
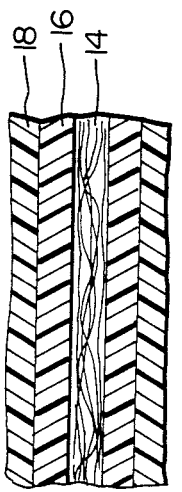
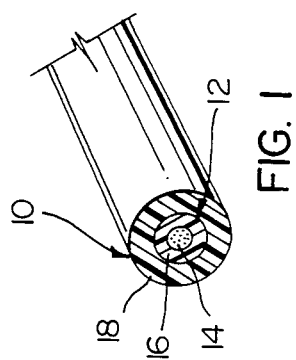
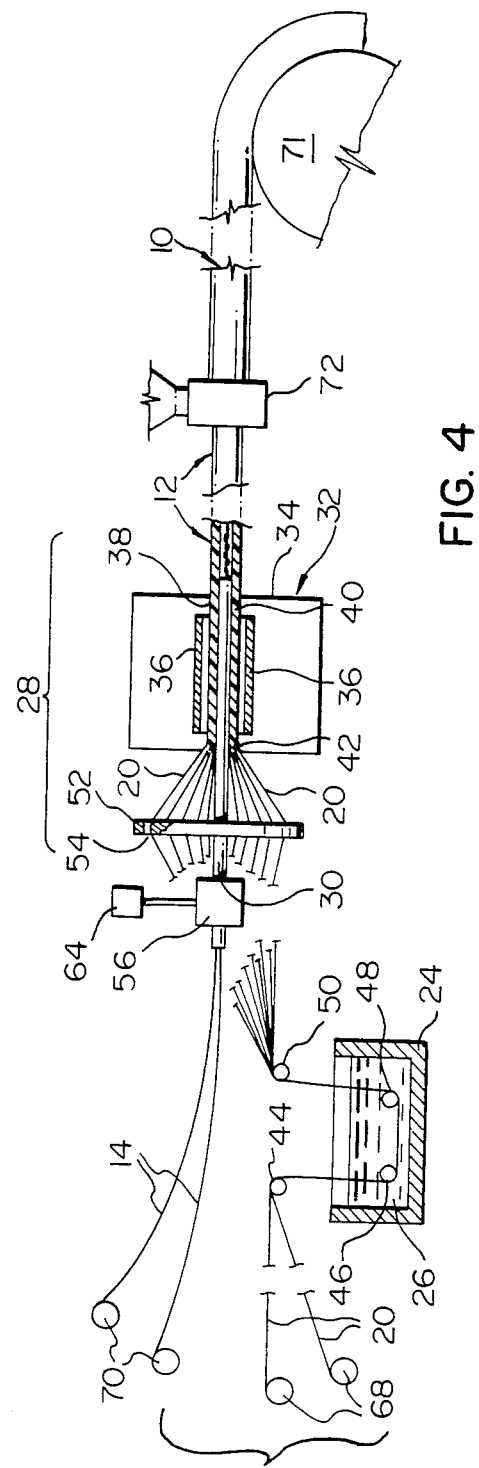

OPTICAL CABLE MANUFACTURE

This invention relates to optical cable manufacture.

Optical cables have certain common elements. These include at least one optical fiber for transmission purposes, means for protecting the fiber from damage, and a jacket which provides the outer layer of the cable.

In some cable structures, optical fibers are housed in grooves formed in the outer surface of a central support member, the grooves extending around the member either helically in one direction or alternately, in each direction around the member.

In other cable structures, an optical fiber or fibers is housed within a plastic tube located coaxially of the cable. These tubes are normally provided for the sole purpose of forming a passage for the fibers and any protection to prevent crushing of the cable and thus of the fibers is provided by a compression resistant shield which surrounds the fiber carrying tube.

In a proposed structure related to a cable, an optical fiber has a reinforced plastic coating surrounding it. This is described in a paper entitled "New Applications of Pultrusion Technology RP Covered Optical Fiber" by K. Fuse and Y. Shirasaka and read before the 40th Annual Conference in January 1985 of Reinforced Plastics/Composites Institute, The Society of the Plastics Industry Inc. As described in that paper, an optical fiber is surrounded by a buffer material and then enclosed within a tube of reinforced plastics by a manufacturing process referred to as pultrusion. In this process, reinforcing fibers are coated with a resin and the coated fibers and the pre-buffered optical fiber are passed through a die with the optical fiber located centrally so that the resin on the reinforcing fibers merges to form the plastic coating.

According to one aspect of the present invention, an optical cable is provided having a core and a jacket, the core comprising at least one optical fiber and a crush resistant tube surrounding and housing the optical fiber, the tube having an inner diameter greater than the diameter of the fiber whereby the fiber is loosely contained by the tube, the tube comprising a plurality of side-by-side and closely packed tensile filaments extending longitudinally of the tube and embedded in a continuous solidified and rigid carrier, and the jacket surrounds the core.

With the structure according to the invention, the optical fiber is loosely contained within the tube so as to enable relative longitudinal movement of fiber and tube during flexing or bending of the cable while axial tension is not placed upon the fiber by the surface of the tube.

In addition, the tube in the construction of the invention has mechanical properties for protecting the optical fiber which are superior to those offered by a conventional plastic tube. This is because in the cable of the invention, with the tensile filaments embedded directly in the tube construction, then the tube is capable of being subjected to less strain under tensile loads upon the case than is the case with a conventional plastics tube. Thus the cable may be made sufficiently strong to protect the fiber under expected loading conditions whereby the use of a metal sheath or shield in the cable for tensile purposes is found to be unnecessary.

The carrier material for the filaments is preferably a thermosetting material such as an epoxy resin and the tensile filaments are preferably glass filaments, but alternatively may, for instance, be high strength aramid fibers, such as "Kevlar".

In a preferred arrangement, the inside of the tube unoccupied by the optical fiber is filled with a water blocking medium. This water blocking medium may be a viscous water blocking medium or is preferably a thixotropic water blocking medium.

According to a further aspect of the present invention, there is provided a method of making an optical cable comprising forming a core for the cable by: coating a plurality of longitudinally tensile and laterally spaced filaments with a flowable and rigidly solidifiable material; guiding the coated filaments towards and then passing them through a tubular space defined by a surface of a surrounding heating means and by a tubular optical fiber guide means disposed within and spaced from the heating means, while causing convergence of the coated filaments to cause them to lie in close relationship and fill the space with the filaments and the flowable material; subjecting the flowable material to an elevated temperature by operation of the heating means as the filaments and material pass through the space whereby, upon emergence from the space, the material has solidified to form material and filaments into a circumferentially rigid tube with the solidified material providing a carrier for the closely packed filaments embedded within the carrier; and simultaneously with the movement of the filaments and carrier through the space, passing at least one optical fiber through the tubular guide means and in the same direction as the filaments, the optical fiber upon emergence from the guide means being enclosed within and loosely contained within the rigid tube which has an inside diameter larger than the diameter of the fiber.

In the use of the above method, it is preferable to introduce a water blocking medium into and passing it through the guide means concurrently with the movement of the optical fiber through the guide means. With this arrangement, the water blocking medium moves into the rigid tube to fill the inside of the tube unoccupied by fiber. It is advantageous to ensure that the optical fiber has an axial length greater than that of the tube. This avoids or minimizes tension in the fiber and allows it to move laterally of the loose fitting tube. Upon bending of the tube, the loosely contained fiber moves in the tube and the longer fiber length avoids tension being placed in the fiber. To provide the additional length of fiber in the tube, the water blocking medium is applied under pressure. This forces it along the guide means and effectively draws the optical fiber into and through the guide means at a speed greater than the speed of movement of the filaments and flowable material through the space.

In addition, the invention includes as a further aspect, an apparatus for making a core for an optical cable comprising: a reservoir for coating a plurality of tensile filaments with a flowable and rigidly solidifiable material; tube forming means to form coated filaments into a circumferentially rigid tube, the tube forming means disposed downstream along a passline for the filaments from the reservoir and comprising a tubular guide means for the optical fiber and a heating means which: (a) surrounds and is spaced from an outer surface of the guide means to define a tubular space to be filled by coated filaments as they move along the passline; and (b) is for heating the flowable material as it moves along the space to form the rigid tube; means for holding the tensile filaments in laterally spaced relationship as they pass through the reservoir, for causing convergence of the coated filaments towards an upstream inlet end of the tubular space and for bringing the coated filaments into close relationship to fill the tubular space with filaments and flowable material; and means for passing at least one optical fiber through a passage within the tubular guide means and in the same direction as the filaments to cause the optical fiber, upon emergence from the guide means, to be enclosed within and loosely contained by the rigid tube.

One embodiment of the invention will now be described, by way of example, with reference to the accompanying drawings, in which:

FIG. 1 is an isometric view of part of a cable according to the embodiment;

FIG. 2 is a cross-sectional view taken along the axis of the cable and on a larger scale than FIG. 1;

FIG. 3 is a cross-sectional view of the cable taken along line III—III in FIG. 2;

FIG. 4 is a diagrammatic side elevational view of apparatus according to the invention for making the cable of FIGS. 1 and 2.

Figure 5:
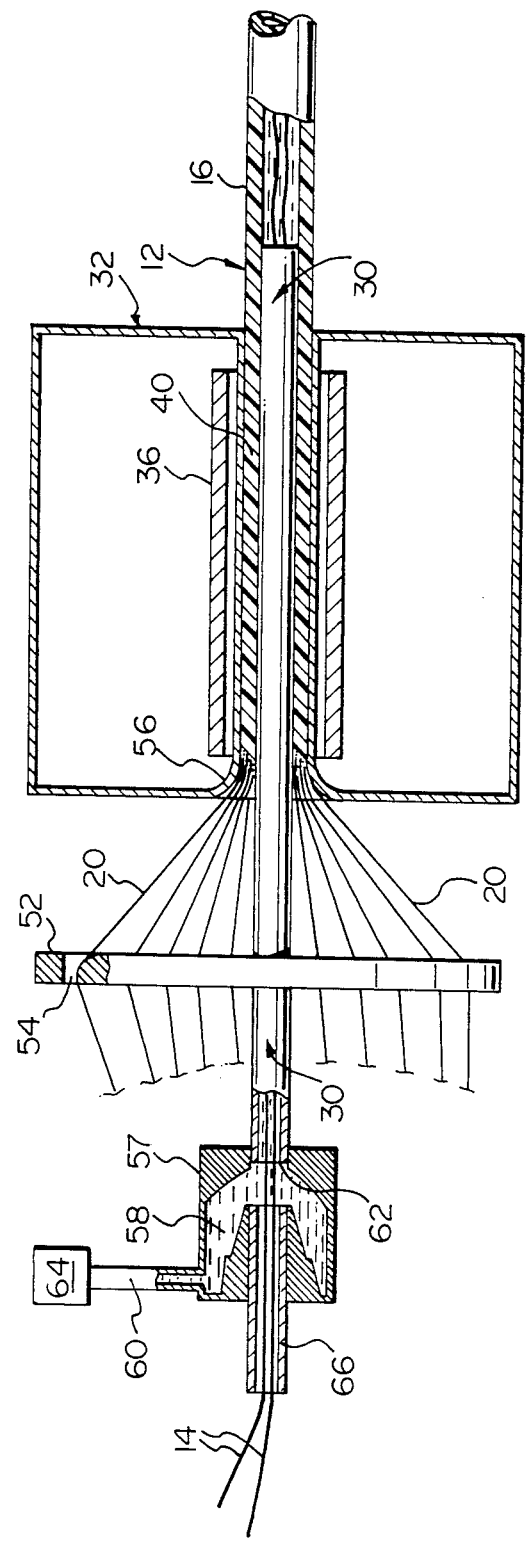
FIG. 5 is a view similar to FIG. 3 of a part of the apparatus on a larger scale.

As shown in FIG. 1, an optical cable 10 has a core 12 comprising a plurality of optical fibers 14 housed within a crush resistant tube 16. The core is surrounded by a dielectric jacket 18 which may be, for instance, a polyethylene based material.

As can be seen from FIGS. 1 and 2, the optical fibers 14 have diameters substantially less than the inside diameter of the tube whereby the fibers are loosely contained within the tube even though there may be ten or more fibers in the cable.

The cable construction of this embodiment does not require a cable sheath or shield to protect the optical fibers as the tube 16 is capable of withstanding substantial tensile loads with insignificant strain. In the particular construction shown in FIG. 1, the cable is capable of being subjected to a tensile load of 600 lbs while the tube satisfactorily protects the fibers from such loading. The outside diameter of the cable of the embodiment is 6.5 mm and the tube, which acts as the strength member, has an outside diameter of 4.1 mm and an inside diameter of 1.7 mm. The tube comprises a plurality of side-by-side and closely packed tensile glass filaments 20 which extend longitudinally of the tube and are embedded within a continuous solidified rigid carrier material 22. This rigid carrier material is a polystyrene or polyester based resin. As can be seen from FIG. 3, the tensile filaments lie in close side-by-side positions while extending longitudinally of the tube. The tube is capable of withstanding up to 600 lbs tensile load, as has been indicated, and with a minimum strain which prevents tensile loads acting directly upon the fibers themselves. Because the tube also forms the tensile strength member of the cable, it is unnecessary to provide the cable with a metal sheath for tensile purposes so that the tube is simply surrounded by the jacket 18.

The tensile filaments extend substantially longitudinally of the tube so as to resist any extension of the cable caused by tensile loading such as may occur during bending or twisting of the cable as it is being installed or after installation. The tensile filaments are provided by, for instance, twenty-four groups of fibers with the groups closely positioned together and, in each group, there are a plurality of strands or rovings of the glass filaments.

The passage in the center of the tube 16 is filled by the optical fibers and a thixotropic water blocking medium which fills any spaces not occupied by the fibers.

The cable is made by the in-line apparatus shown in FIGS. 4 and 5. As can be seen, the apparatus comprises a reservoir 24 holding a bath 26 of the polystyrene or polyester based resin. Downstream along a passline for the groups of tensile filaments 20 is disposed a tube forming means 28. This tube forming means comprises a tubular guide means in the form of a stainless steel tube 30 which extends along the passline of the glass fibers and has a polished outer surface. Surrounding a downstream end portion of the tube 30 is a heating means 32 which comprises a housing 34 shrouding heating elements 36 which may be electrical. As can be seen from FIG. 4 the housing 34 has an inner cylindrical surface 38 which is polished and surrounds the downstream end portion of tube 30 while being spaced from it to define a tubular space 40 between the heating element and the tube 30.

Guide means is provided for holding the tensile filaments 20 in laterally spaced relationship as they pass through the reservoir 24, for disposing these groups of filaments in spaced apart positions around an arc concentric with the tube 30 and also for causing convergence of the groups of coated filaments towards an upstream inlet end 42 of the tubular space 40 to bring the groups of filaments into close relationship as they enter the space. This guide means comprises a plurality of side-by-side guide pulleys 44, one pulley for each of the groups of tensile filaments. In FIG. 4 only one of the guide pulleys 44 is shown as the guide pulleys 44 for all filament groups are in alignment in that Figure. From guide pulleys 44 to pulleys 50 lying downstream, the paths of all filament groups are in alignment, i.e. around pulleys 46 and 48 so that one only of each of these pulleys and of pulley 50 are shown in FIG. 4. The guide means also comprises a circular guide plate 52 through which the tube 30 passes at an upstream end portion of the tube. The guide plate 52 has a plurality of guide holes 54, i.e. one for each of the groups of tensile filaments and these holes are spaced apart around a pitch circle coinciding with the axis of the tube 30 in equally spaced positions around that axis. The guide means also comprises a leading chamfered edge 56 of the housing 34 (see FIG. 5) for smoothly contacting the tensile filaments as they move into the space 40.

The apparatus also comprises a means for introducing the water blocking thixotropic medium into the crush resistant tube 16. This means comprises an applicator 56 which comprises a housing mounted at the upstream end of the tube 30. The housing 56 defines passageways 58 from an inlet 60 to an outlet 62 of the housing to enable the thixotropic medium to be pumped through the inlet 60 from a source not shown, through the passages and out of the housing into the inlet of the tube 30. A pump 64 (see FIG. 5) is provided for pressurizing the thixotropic medium so that it is forced along the tube 30. The pump 64 is adjustable in speed to alter the pressure for a reason to be discussed below. At an upstream side of the housing 56 there is provided a concentric inlet tube 66 for admittance of the optical fibers 14 to enable the fibers to be fed into the tube 16 during its formation, as will now be described.

In use of the apparatus shown in FIGS. 4 and 5, the groups of tensile filaments 20 are mounted respectively upon individual reels 68 upstream of the reservoir 24. Also at the upstream end of the apparatus are disposed a plurality of spools 70, each spool wound with one of the optical fibers 14. The groups of tensile filaments 20 are fed around their respective pulleys 44, 46, 48 and 50. As the groups of filaments are passed through the bath 26, each individual filament becomes coated with the resin which is at room temperature. The groups of filaments then proceed from the bath around the pulley 50, and around any additional guiding pulleys which are required (not shown) to bring the groups through individual holes 54 in the guide plate 52 and form them into a circular array surrounding the tube 30. The groups then are caused to converge towards each other and towards the tube 30 so as to guide them into the passage 40. As the groups of filaments enter the passage 40, they lie in close relationship and the space 40 becomes filled with the filaments and the resin coating material which surrounds them.

The filaments and resin are drawn along their passlines and through space 40 by a cable reeler 71 and are caused to be molded within the space 40 into the solidified tube by the heating means 32 operating at the required temperature, in this case approximately 300° F., to solidify the resin before it leaves the space. The completely solidified tube thus moves downstream from within the heater 32.

During the movement of the groups of filaments in the above described manner along their passlines, the fibers 14 are passed from the spool 70 through the tube 66 and device 56 and into the entrance of the tube 30 as shown in FIG. 5. The thixotropic water blocking medium is passed into the passage 58 of the device 56 by the pump 64 so that it surrounds the fibers 14 and is forced in a downstream direction along the tube 30 and, upon leaving this tube, enters into the solidified tube 16. The flow of the thixotropic medium draws the optical fibers 14 from their spools 70 so as to move them into the tube 16 as the core is being manufactured. Thus the core is completely filled by the optical fibers and the water blocking medium.

It is desirable that each of the optical fibers has a greater axial length than the tube 16 into which it is being fed so that any bending of the tube 16, in use of the finished cable will merely tend to cause relative axial movement of the tube and fibers in the vicinity of the bend without placing the fibers in tension. To enable the length of each optical fiber to be greater than that of the tube, the pressure placed upon the filling medium is changeable by altering the speed of the pump 64 so that an increased flow of the medium will draw the optical fibers from their spools at a greater rate. This drawing action forces the optical fibers along the tube 30 at a greater speed than that of the tensile filaments through the space 40, whereby upon the optical fibers and water blocking medium emerging into the tube 16 at the downstream end of the guide means 30, the speed of the optical fibers and of the filling medium is reduced. This leads to a meandering of the optical fibers within the oversize passage of the tube 16 as illustrated by FIG. 2. The degree of this meandering may be controlled by the changing of the speed of the pump 64.

Upon the finished core 12 of the cable emerging from the apparatus 28, it then proceeds in in-line fashion through a cross-head 72 of an extruder (not shown) in which the core is provided with the surrounding jacket 18 to complete the cable 10.

As can be seen from the above embodiment, the cable structure is relatively simple in construction and avoids the necessity of using a shield surrounding the tube 16 for protection of the optical fibers during normal tensile loading conditions. It has been shown that the tube 16, because of its structure, is capable of withstanding significant tensile loads while protecting the optical fibers. The process of the invention, and as described in the embodiment, produces an inside diameter to the tube 16 which is far in excess of that of each of the optical fibers so that the fibers are radially movable within the tube. The process also enables the fibers to have axial lengths which are greater than that of the tube 16 whereby tensile loads placed upon the tube and finished cable will merely tend to straighten the fibers, as described, without placing them into tensile loaded conditions.

In a modification of the above-described embodiment (not shown) a shield for resisting compressive loading may be placed around the tube 16 and under the jacket should it be found that the cable is to be used in conditions where it may be subjected to excessive compressive loads, but even under those conditions the tube 16 will assist the shield in providing the resistance to such compressive loading. This shield will also protect the fibers from action of gnawing animals.

What is claimed is:

1. Apparatus for making a core for an optical cable comprising:
    a reservoir for coating a plurality of tensile glass filaments with a flowable and rigidly solidifiable material;
    tube forming means to form coated filaments into a circumferentially rigid tube, the tube forming means disposed downstream along passline for the filaments from the reservoir and comprising a tubular guide means for optical fiber, the tube forming means also comprising a heating means which:
    (a) surrounds and is spaced from an outer surface of the guide means to define a tubular space to be filled by coated filaments as they move along the passline; and
    (b) is for heating the flowable material as the flowable material moves along the space to form the rigid tube;
    means for holding the tensile filaments in laterally spaced relationship as the filaments pass through the reservoir, for causing convergence of the coated filaments towards an upstream inlet end of the tubular space and for bringing the coated filaments into close relationship to fill the tubular space with filaments and flowable material; and
    the tubular guide means having an upstream inlet to a passage of the guide menas to enable at least one optical fiber to be passed along the passage and in the same direction as the filaments to cause the fiber, upon emergence from the guide means, to be enclosed within and loosely contained by the rigid tube.

2. Apparatus according to claim 1 comprising means for introducing a water blocking medium into the rigid tube, said introducing means located at the upstream end of the tubular guide means and having an outlet interconnected with the passage within the tubular guide means.

3. A method of making an optical cable comprising:
    forming a core for the cable by coating a plurality of longitudinally tensile and laterally spaced glass filaments with a flowable and rigidly solidifiable material;
    guiding the coated filaments towards and then passing them through a tubular space defined by a surface of a surrounding heating means and on the inside by a tubular optical fiber guide means disposed within and spaced from the heating means, while causing convergence of the coated filaments to bring them into close relationship and fill the space with the filaments and the flowable material;

subjecting the flowable material to an elevated temperature by operation of the heating means as the filaments and material pass through the space whereby, upon emergence from the space, the material has solidified to form the material and filaments into a circumferentially rigid tube with the solidified material providing a carrier for the closely packed filaments; and simultaneously with the movement of the filaments and carrier through the space, passing at least one optical fiber through the tubular guide means and in the same direction as the filaments, the fiber upon emergence from the guide means being enclosed within and loosely contained within the rigid tube which has an inside diameter larger than the diameter of the fiber.

4. A method according to claim 3 wherein during the passing of at least one optical fiber along the tubular guide means, the method comprises introducing a water blocking medium into and passing it through the guide means, the water blocking medium moving into the rigid tube as the tube is formed to fill the inside of the tube which is unoccupied by fiber.

5. A method according to claim 4 comprising pressurizing the water blocking medium so as to force the water blocking medium along the guide means, and drawing the at least one optical fiber into and through the guide means by means of the pressurized water blocking medium to cause the fiber to move through the tube at a speed greater than the speed of movement of the filaments and flowable material through the space and thus provide a length of optical fiber inside the tube which is greater than the length of the tube itself.

* * * * *